(12) United States Patent
Schneider

(10) Patent No.: US 10,594,156 B2
(45) Date of Patent: Mar. 17, 2020

(54) WIRELESS CHARGING SYSTEM WITH MULTI-COIL SCANNING AND LEARNING

(71) Applicant: NIKE, Inc., Beaverton, OR (US)

(72) Inventor: Summer L. Schneider, Beaverton, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

(21) Appl. No.: 15/878,032

(22) Filed: Jan. 23, 2018

(65) Prior Publication Data

US 2018/0219403 A1 Aug. 2, 2018

Related U.S. Application Data

(60) Provisional application No. 62/449,460, filed on Jan. 23, 2017.

(51) Int. Cl.
*H02J 50/10* (2016.01)
*H02J 7/02* (2016.01)
(Continued)

(52) U.S. Cl.
CPC .............. *H02J 7/025* (2013.01); *H01F 27/28* (2013.01); *H02J 50/10* (2016.02); *A43B 3/0005* (2013.01);
(Continued)

(58) Field of Classification Search
USPC ........................................................ 320/108
See application file for complete search history.

(56) References Cited

U.S. PATENT DOCUMENTS 8,810,071 B2 * 8/2014 Sauerlaender .......... H02J 5/005
307/104
2010/0156347 A1 6/2010 Lee et al.
(Continued)

FOREIGN PATENT DOCUMENTS

CN 110462967 A 11/2019
KR 1020190112039 A 10/2019
WO WO-2018136940 A1 7/2018

OTHER PUBLICATIONS

"International Application Serial No. PCT/US2018/014868, International Search Report dated May 4, 2018", 3 pgs.
(Continued)

*Primary Examiner* — Robert Grant
(74) *Attorney, Agent, or Firm* — Schwegman Lundberg & Woessner, P.A.

(57) ABSTRACT

A system, recharge apparatus, and method includes transmit coils positioned in a pattern to allow at least one of the transmit coils to establish a wireless link with a receive coil positioned in proximity of the recharge apparatus. A power source is coupled to the transmit coils and configured to selectively energize ones of the transmit coils to transfer power to the receive coil. An energy efficiency detection circuit is configured to detect an electrical response of each one of the transmit coils when energized by the power source, the electrical response indicative of an energy efficiency between the one of the transmit coils and the receive coil. The power source selectively energizes ones of the transmit coils, selected according to a statistical analysis of an historical record and the electrical response indicative of the energy efficiency meeting a minimum efficiency criterion for energy transfer to the receive coil.

18 Claims, 9 Drawing Sheets

(51) Int. Cl.
*H01F 27/28* (2006.01)
*A43C 11/16* (2006.01)
*A43B 3/00* (2006.01)
*A43B 7/04* (2006.01)

(52) U.S. Cl.
CPC .............. *A43B 3/0031* (2013.01); *A43B 7/04* (2013.01); *A43C 11/165* (2013.01)

(56) References Cited

U.S. PATENT DOCUMENTS

| | | |
|---|---|---|
| 2012/0326522 A1 | 12/2012 | Fukushima |
| 2013/0221913 A1* | 8/2013 | Kim ........................ H02J 5/005 320/108 |
| 2015/0130408 A1 | 5/2015 | Wei |
| 2016/0126772 A1 | 5/2016 | Huang et al. |
| 2016/0141908 A1 | 5/2016 | Jakl et al. |

OTHER PUBLICATIONS

"International Application Serial No. PCT/US2018/014868, Written Opinion dated May 4, 2018", 7 pgs.
"International Application Serial No. PCT/US2018/014868, International Preliminary Report on Patentability dated Aug. 1, 2019", 9 pgs.

* cited by examiner

WIRELESS CHARGING SYSTEM WITH MULTI-COIL SCANNING AND LEARNING

RELATED APPLICATIONS

This application claims the benefit of priority to U.S. Provisional Application Ser. No. 62/449,460, filed Jan. 23, 2017, the content of which is hereby incorporated by reference in its entirety.

TECHNICAL FIELD

The subject matter disclosed herein generally relates to a wireless charging system with multi-coil scanning and learning.

BACKGROUND

Wearable articles, such as footwear, apparel, bracelets, watches, and other wearable electronic devices, often include an internal power source. The internal power source may include a rechargeable battery and a recharge system for wirelessly receiving power to recharge the battery. The recharge system may include an external transmit coil that couples, e.g., inductively, with an internal receive coil and utilize current induced in the receive coil to recharge the battery.

BRIEF DESCRIPTION OF THE DRAWINGS

Some embodiments are illustrated by way of example and not limitation in the figures of the accompanying drawings.

DETAILED DESCRIPTION

Figure 1:
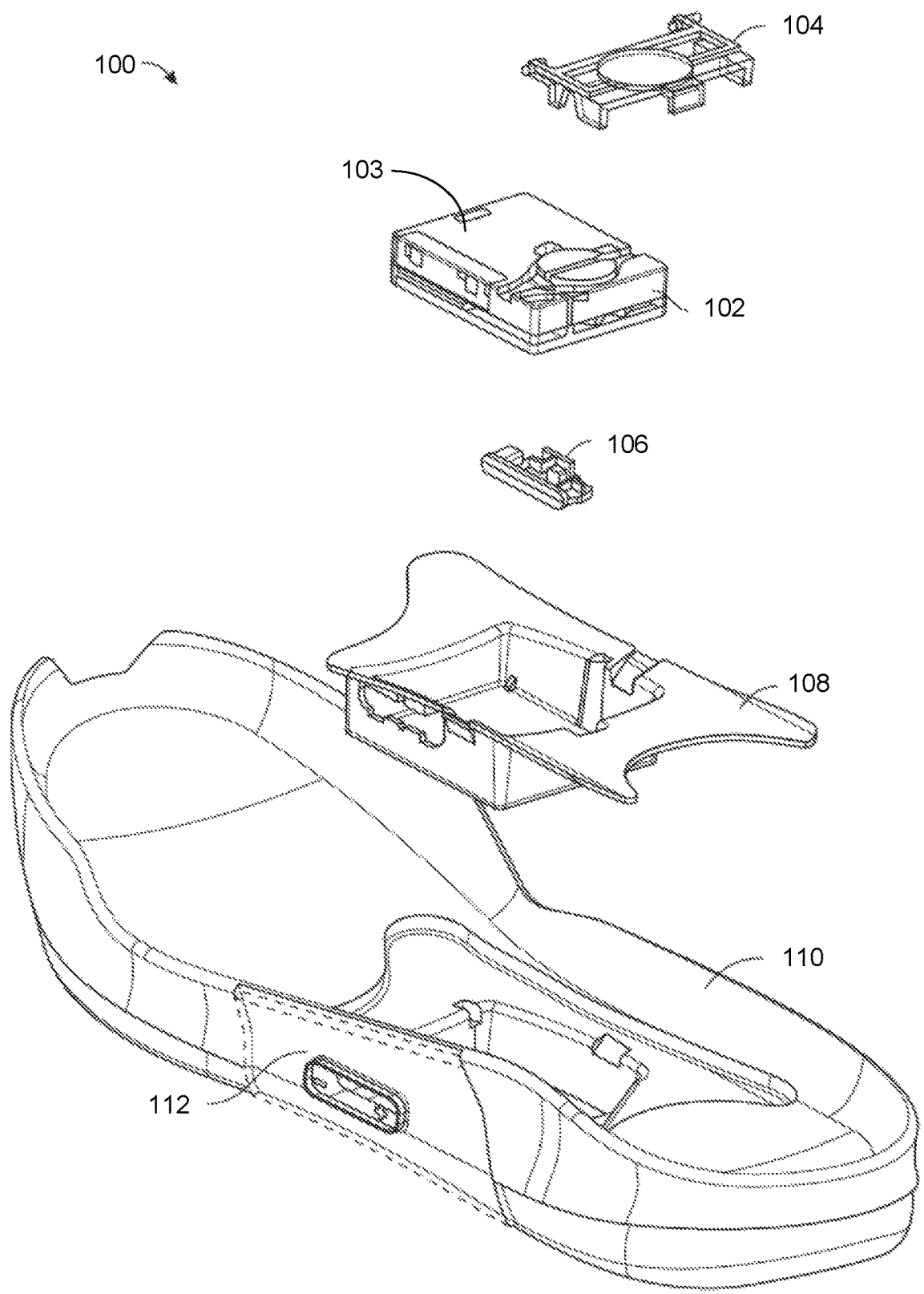
FIG. 1 is an exploded view illustration of components of a motorized lacing system for an article of footwear, in an example embodiment.

Example methods and systems are directed to a wireless charging system with multi-coil scanning and learning. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Wireless charging systems for wearable articles may include more than one primary transmit coil. The transmit coils may be placed in or on an article so that the transmit coils cover a larger area than may be achieved by a single transmit coil. Thus, for instance, the transmit coils may be positioned on or in a mat with the centers of the coils spaced apparat with respect to one another. In such a configuration, the wearable article may be placed on a surface of the mat and the recharge system may energize one or more of the transmit coils to induce the recharge current n the receive coil. The recharge system may optionally determine that a particular one of the transmit coils are best able to efficiently transfer power to the receive coil based on the current that may be driven through each transmit coil and, as a result, select that particular one of the transmit coils to energize.

To determine the current being driven through each transmit coil, the recharge system may sequentially energize each coil, measure the current induced in the transmit coil, and then select the one of the transmit coils with the highest current. However, doing so may inevitably and inherently require a noticeable amount of time to sequentially go through the various transmit coils. For instance, if it takes one (1) second to assess the efficiency of any given transmit coil, and five (5) transmit coils are included in the recharge system, then five (5) seconds may be needed to identify the most efficient transmit coil. In various implementations of the recharge system in relation to a wearable article, such as with footwear with a rechargeable battery, delays in starting efficient recharging may be noticeable and particularly undesirable. For instance, the wearer may seek to recharge the footwear while wearing the footwear or may seek to recharge the footwear relatively quickly during a sporting event, e.g., during a "timeout" in a basketball game or during a halftime break. In such an example, the wearer may readily perceive that multiple seconds are passing without recharging beginning. Moreover, in situations where charging may only be possible for, e.g., thirty (30) seconds to two (2) minutes, five (5) seconds spent ascertaining which transmit coil is efficiently aligned with the receive coil may constitute a significant percentage of the total time available for recharging and, as a result, meaningfully reduce the percentage of recharging that may occur.

In particular examples of wearable articles, such in rechargeable footwear, the position of the receive coil in the wearable article may be dependent on the size of the wearable article. For instance, while a recharge coil may consistently be positioned in the midsole of an article of footwear, owing to the dimensions of the article of footwear the receive coil may tend to consistently end up efficiently linked with a certain one of the transmit coils when the article of footwear is positioned with respect to the apparatus including the transmit coils, e.g., a mat. However, because of the difference in size, the receive coil of a relatively small article of footwear may tend to align with a different transmit coil than the receive coil of a relatively large article of footwear when otherwise normally placed on the mat, as illustrated herein.

A recharge system has been developed that includes multiple transmit coils. The recharge system is configured to sequentially energize individual transmit coils to identify one of the transmit coils that has a highest measured efficiency. The recharge system notes which transmit coils have the highest efficiency over time and dynamically favor those transmit coils during the scan. Upon a transmit coil meeting an efficiency threshold condition, that transmit coil may be utilized to conduct, in whole or in part, the recharge session, or a limited number of the remaining transmit coils may be checked for efficiency over the course of the recharge session. In so doing, the recharge system may quickly settle on a transmit coil that may efficiently provide power to the recharge coil, lessening the time to recharge and potentially improving the perception of the wearer or owner of the wearable article of how responsive the recharge system is.

FIG. 1 is an exploded view illustration of components of a motorized lacing system for an article of footwear, in an example embodiment. While the system is described with respect to the article of footwear, it is to be recognized and understood that the principles described with respect to the article of footwear apply equally well to any of a variety of wearable articles. The motorized lacing system 100 illustrated in FIG. 1 includes a lacing engine 102 having a housing structure 103, a lid 104, an actuator 106, a mid-sole plate 108, a mid-sole 110, and an outsole 112. FIG. 1 illustrates the basic assembly sequence of components of an automated lacing footwear platform. The motorized lacing system 100 starts with the mid-sole plate 108 being secured within the mid-sole. Next, the actuator 106 is inserted into an opening in the lateral side of the mid-sole plate opposite to interface buttons that can be embedded in the outsole 112. Next, the lacing engine 102 is dropped into the mid-sole plate 108. In an example, the lacing system 100 is inserted under a continuous loop of lacing cable and the lacing cable is aligned with a spool in the lacing engine 102 (discussed below). Finally, the lid 104 is inserted into grooves in the mid-sole plate 108, secured into a closed position, and latched into a recess in the mid-sole plate 108. The lid 104 can capture the lacing engine 102 and can assist in maintaining alignment of a lacing cable during operation.

Figure 2:
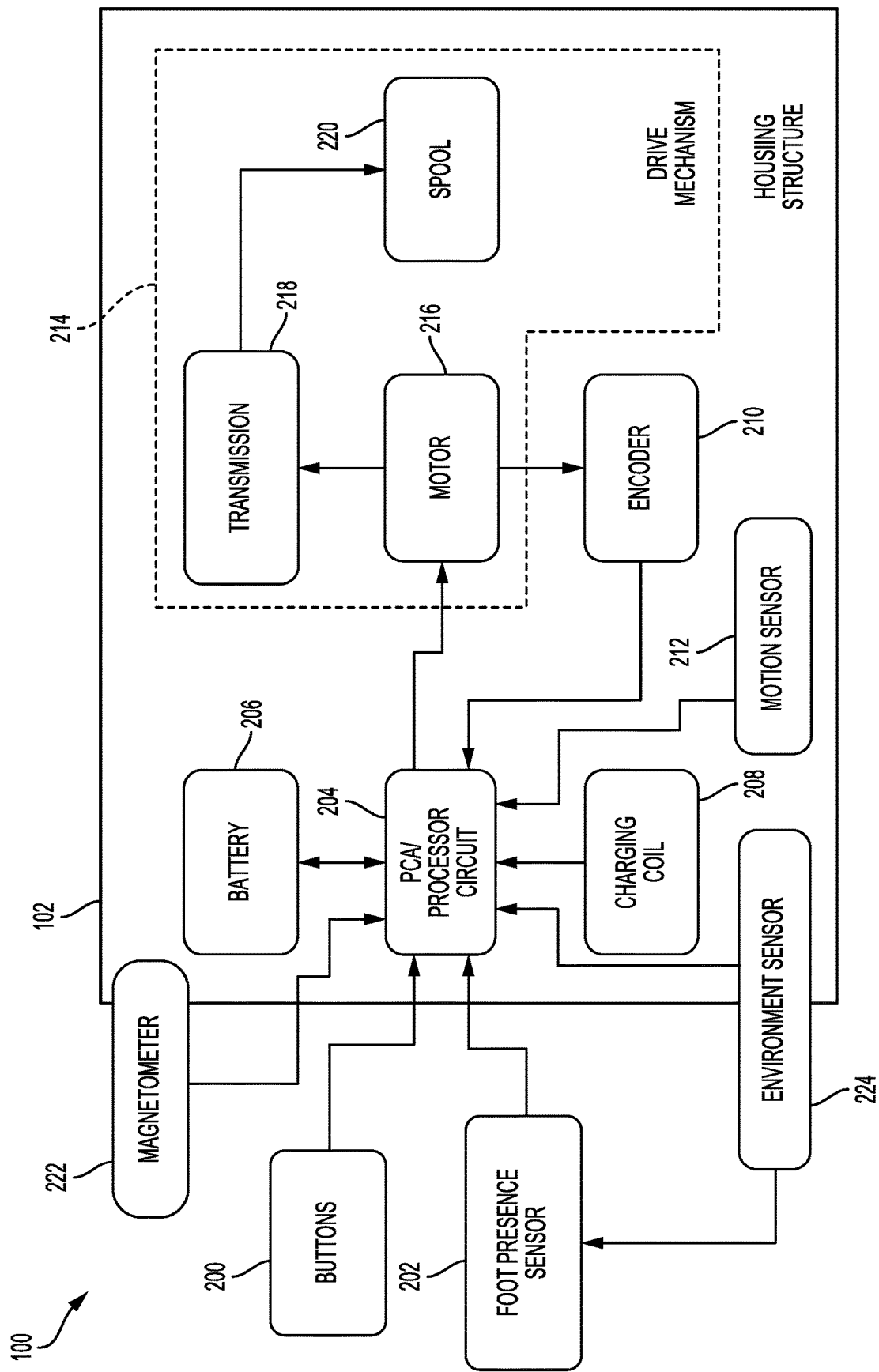
FIG. 2 illustrates generally a block diagram of components of a motorized lacing system, in an example embodiment.

FIG. 2 illustrates generally a block diagram of components of a motorized lacing system 100, in an example embodiment. The system 100 includes some, but not necessarily all, components of a motorized lacing system such as including interface buttons 200, a foot presence sensor 202, and the lacing engine housing 102 enclosing a printed circuit board assembly (PCA) with a processor circuit 204, a battery 206, a receive coil 208, an encoder 210, a motion sensor 212, and a drive mechanism 214. The drive mechanism 214 can include, among other things, a motor 216, a transmission 218, and a lace spool 220. The motion sensor 212 can include, among other things, a single or multiple axis accelerometer, a magnetometer, a gyrometer, or other sensor or device configured to sense motion of the housing structure 102, or of one or more components within or coupled to the housing structure 102. In an example, the motorized lacing system 100 includes a magnetometer 222 coupled to the processor circuit 204.

In the example of FIG. 2, the processor circuit 204 is in data or power signal communication with one or more of the interface buttons 200, foot presence sensor 202, battery 206, receive coil 208, and drive mechanism 214. The transmission 218 couples the motor 216 to a spool to form the drive mechanism 214. In the example of FIG. 2, the buttons 200, foot presence sensor 202, and environment sensor 224 are shown outside of, or partially outside of, the lacing engine 102.

In an example, the receive coil 208 is positioned on or inside of the housing 103 of the lacing engine 102. In various examples, the receive coil 208 is positioned on an outside major surface, e.g., a top or bottom surface, of the housing 103 and, in a specific example, the bottom surface. In various examples, the receive coil 208 is a qi charging coil, though any suitable coil, such as an A4WP charging coil, may be utilized instead.

In an example, the processor circuit 204 controls one or more aspects of the drive mechanism 214. For example, the processor circuit 204 can be configured to receive information from the buttons 200 and/or from the foot presence sensor 202 and/or from the motion sensor 212 and, in response, control the drive mechanism 214, such as to tighten or loosen footwear about a foot. In an example, the processor circuit 204 is additionally or alternatively configured to issue commands to obtain or record sensor information, from the foot presence sensor 202 or other sensor, among other functions. In an example, the processor circuit 204 conditions operation of the drive mechanism 214 on (1) detecting a foot presence using the foot presence sensor 202 and (2) detecting a specified gesture using the motion sensor 212.

Information from the environment sensor 224 can be used to update or adjust a baseline or reference value for the foot presence sensor 202. As further explained below, capacitance values measured by a capacitive foot presence sensor can vary over time, such as in response to ambient conditions near the sensor. Using information from the environment sensor 224, the processor circuit 204 and/or the foot presence sensor 202 can update or adjust a measured or sensed capacitance value.

Figure 3A:
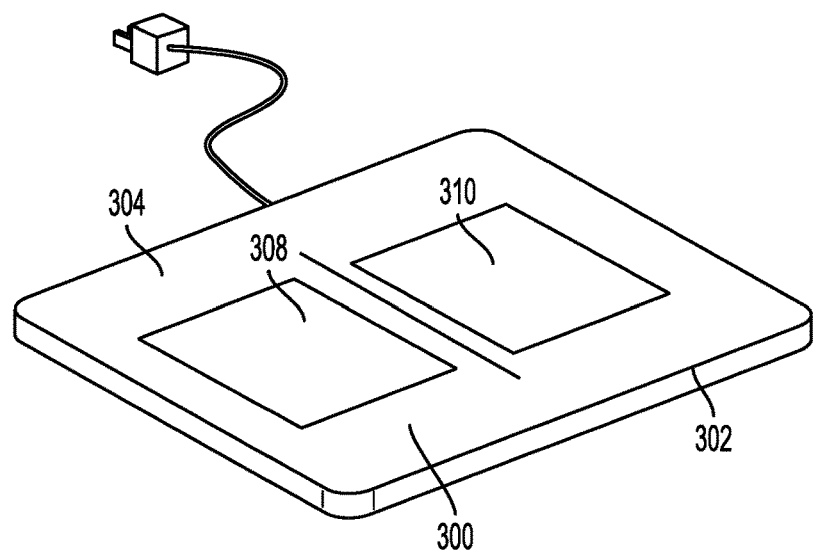
FIGS. 3A-3C are depictions of a recharge apparatus, in an example embodiment.
Figure 3B:
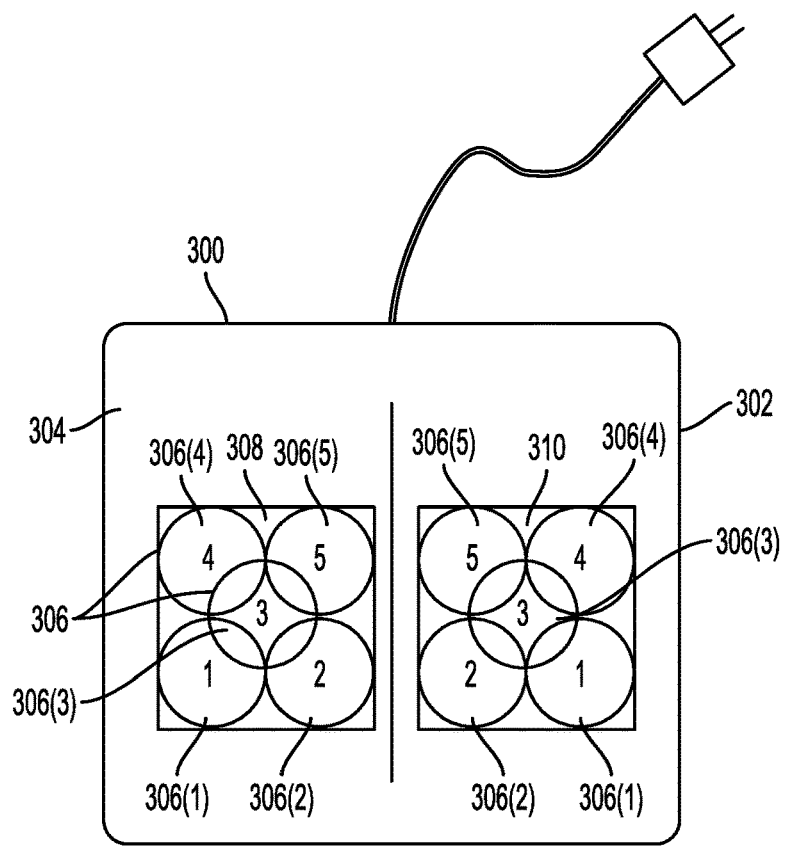
Figure 3C:
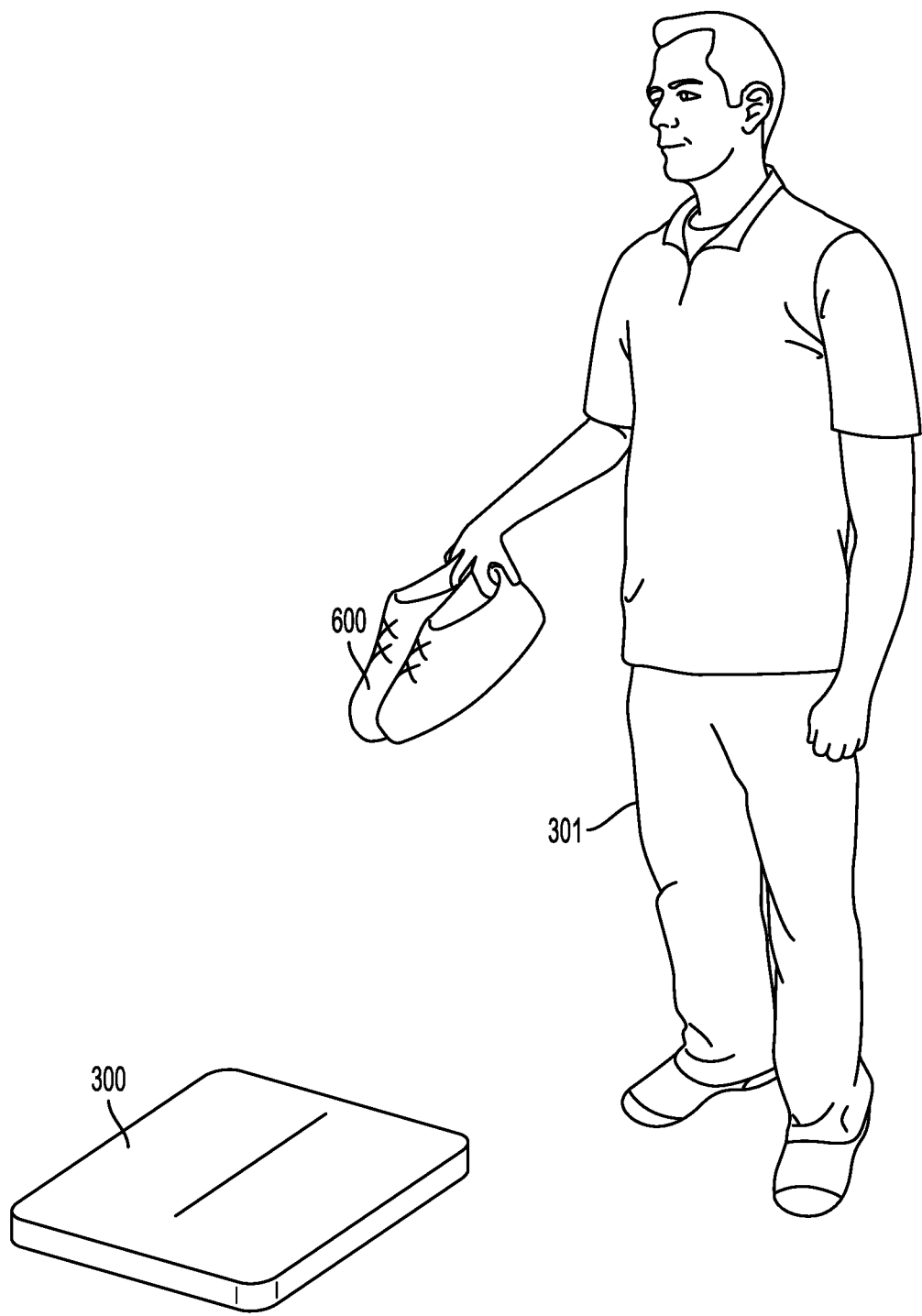

FIGS. 3A-3C is a perspective and cutaway depiction of a recharge apparatus 300, in an example embodiment. FIG. 3A illustrates a perspective depiction of the recharge apparatus 300. FIG. 3B illustrates a cutaway depiction of the recharge apparatus 300. FIG. 3C illustrates the recharge apparatus 300 in relation to a user 301 holding articles of footwear (e.g., the articles of footwear 600 described in detail herein).

As illustrated, the recharge apparatus 300 is a recharge mat including a housing 302 forming a recharge surface 304 on which wearable articles, such as articles of footwear, may be placed. The recharge apparatus 300 further includes a plurality of transmit coils 306 configured to create a wireless connection, e.g., an inductive wireless connection, with the receive coil 208.

In the illustrated example, the recharge apparatus 300 is configured with two recharge sections 308, 310 in the example configured to recharge articles of footwear, as illustrated herein. As such, one article of footwear 308, e.g., a left shoe, may be placed on one recharge section 308 while another article of footwear, e.g., a right shoe, may be placed on the other recharge section 310. Each recharge section 308, 310 may include its own plurality of transmit coils 306; thus, the first recharge section 308 may include a first plurality of recharge coils 306 and the second recharge section 310 may include a second plurality of transmit coils 306. In an example, each recharge section 308, 310 has dimensions of approximately eighty (80) millimeters by one hundred (100) millimeters where the transmit coils 306 each have a diameter of approximately forty (40) millimeters. The two recharge sections 308, 310 may be treated for these purposes as separate recharge systems that happen to operate in conjunction with one another. That is to say, even while each recharge section may operate with a common electronics, each recharge section 308, 310 may independently be assessed for which transmit coil 306 within that section is in an efficient alignment with a receive coil 208 and energized for a recharge session accordingly. However, it is to be recognized and understood that recharge apparatuses 300 made according to this specification may be made with more or fewer recharge sections 308, 310 as appropriate to the wearable article to be recharged. Moreover, for the purposes of this disclosure, only one recharge section 308, 310 may be discussed at a time, but it is to be recognized and understood that the principles disclosed with respect to the electronics and hardware of one recharge section 308 may be applied concurrently with and to the other recharge section 310.

Figure 4:
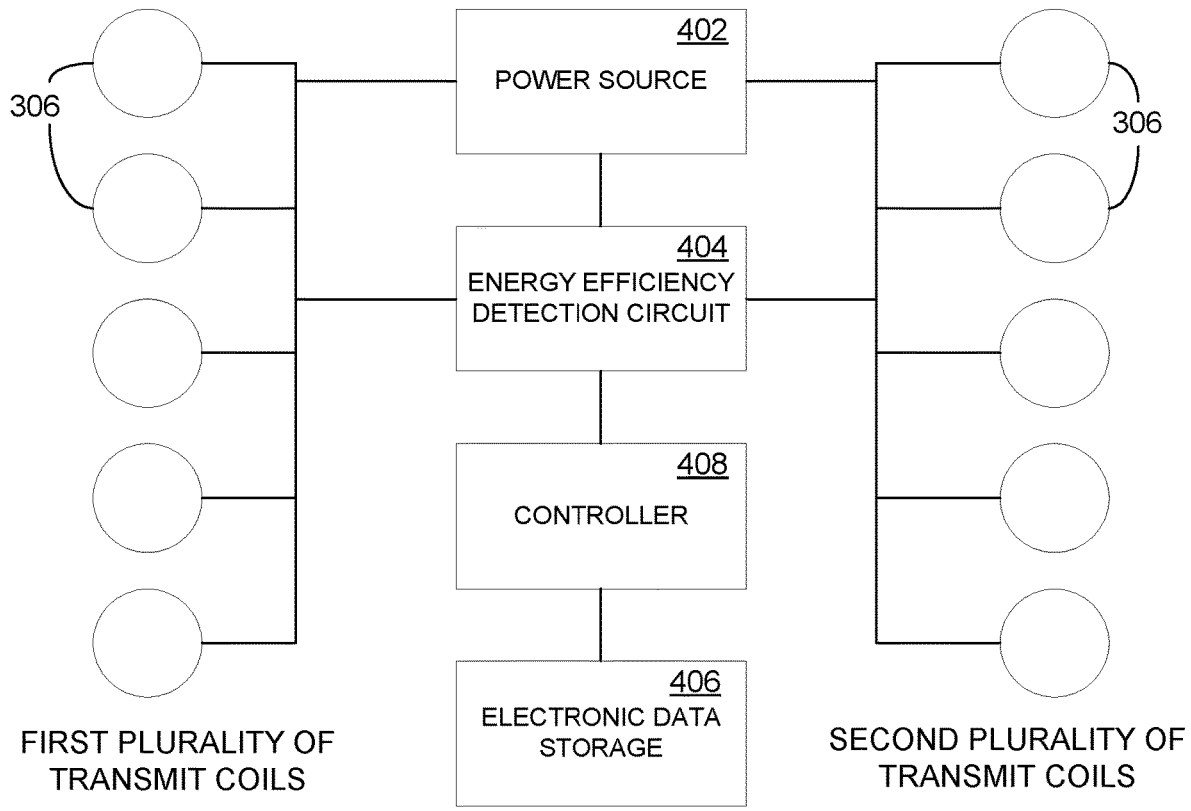
FIG. 4 is a block diagram of electronic components of a recharge system, in an example embodiment.

FIG. 4 is a block diagram of electronic components of a recharge system 400, in an example embodiment. In various examples, the components of the recharge system 400 are all included in the recharge apparatus 300 or an alternative, single recharge apparatus. However, it is to be recognized and understood that any of a variety of the components may be included remote to the recharge apparatus 300.

Each of the plurality of transmit coils 306 is electrically coupled to a power source 402, an energy efficiency detection circuit 404, an electronic data storage 406, and a controller 408. The power source 402 may be self-contained with a battery or may be coupled to an external power source, such as a conventional outlet, such that sufficient voltage and current is available to energize at least one transmit coil 306 at a time sufficient to transfer energy to the receive coil 208 according to specified parameters. In various examples, the power source 402 may also provide power to operate other components of the system 400.

The energy efficiency detection circuit 404 is configured to detect an electrical response of each transmit coil 306 as that transmit coil 306 is energized. The electrical response may be any electrical response that is indicative of an efficiency of a connection between the transmit coil 306 and the receive coil 208. In an example, the energy efficiency detection circuit 404 is a current meter or ammeter. The efficiency of the connection between the transmit coil 306 and the receive coil 208 may be proportional to the current induced through the transmit coil 306 upon the transmit coil 306 being energized by the power source 402. Upon detecting the current through the transmit coil 306, the energy efficiency detection circuit 404 may transmit that information to the controller 408, which may compare the detected current values between and among the various transmit coils 306 in order to identify a one of the transmit coils 306 that has a highest detected current and, therefore, a highest energy transfer efficiency. The controller 408 may also cause the efficiency values as determined to be stored in the electronic data storage 406. In such an example, the energy efficiency detection circuit 404 may allow the system 400 to operate without information from the wearable article.

The efficiency values may function as an historical record of past use of the system 400 generally. The historical record may include all such efficiency values or may be time-limited, e.g., may include the most recent predetermined number of efficiency values obtained, e.g., the most recent ten (10), twenty (20), fifty (50), one hundred (100), or more, as desired and as may be empirically determined within the context of the system 400 to provide efficiency values useful for the purposes described herein.

Alternatively, the energy efficiency detection circuit 404 may measure power delivered to the energized transmit coil 306 and may receive a measure of the power received by the receive coil 208 and may compare those two power values. In such an example, the wearable article generally and the motorized lacing system 100 specifically may include the capacity to measure the power received by the receive coil 208 and transmit that information to the system 400 and, ultimately, to the energy efficiency detection circuit 404 and/or to the controller to allow the energy efficiency detection circuit 404 and/or the controller to compare the energy transmitted vs. the energy received to provide a ratio or other measured difference which may be utilized to determine which transmit coil 306 is best aligned with the receive coil 208

The controller 408 may cause the power source to serially deliver power to individual ones of the plurality of transmit coils 306 according to two modes. The first mode is a test mode, in which one transmit coil 306 may be energized at a time according to a predetermined sequence. The predetermined sequence may be based on the order in which the transmit coils 306 have, in prior instances of energizing the transmit coil 306, the highest energy efficiency values as determined above and as stored and accessed by the controller 408 from the electronic data storage. The second mode is a power delivery mode, in which, after one of the transmit coils 306 is identified as having a suitably high or highest efficiency, that transmit coil 306 is selected as the transmit coil 306 to conduct a recharge session. In such an example, the selected transmit coil 306 delivers power to the receive coil 208 until the recharge session is ended according to normal parameters, e.g., because the battery 206 is fully charged, the operator terminates the recharge session before the battery 206 is fully charged, or another factor causes the recharge session to terminate (e.g., a safety condition, a timeout condition, etc.).

In examples in which multiple recharge segments 308, 310 are included, each segment 308, 310 may include its own, unique set of transmit coils 306 coupled to a common power source 402, energy efficiency detection circuit 404, an electronic data storage 406, and a controller 408, with each of those components configured to interact with multiple sets of transmit coils 306 simultaneously. Alternatively, each recharge segment 308, 310 may be implemented with their own unique set of electronic components. In such an example, recharge apparatus 300 may be understood to include multiple unique implementation of the recharge system 400, with one recharge system 400 being uniquely implemented in each section 308, 310.

Figure 5:
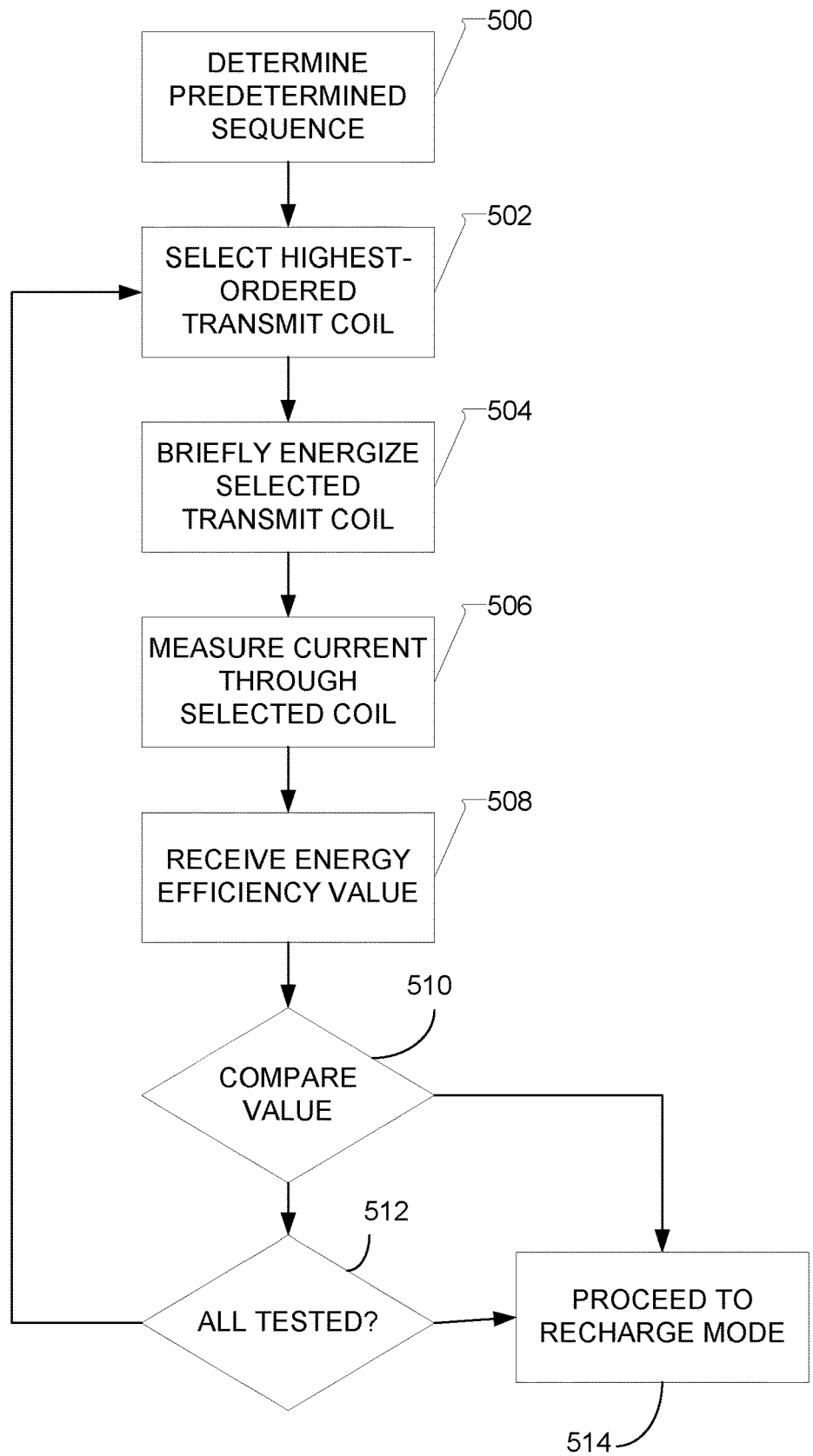
FIG. 5 is a flowchart for operating a recharge system, in an example embodiment.

FIG. 5 is a flowchart for operating the recharge system 400, in an example embodiment. While the flowchart is described with respect to the recharge system 400, it is to be recognized and understood that the flowchart may be applied to any suitable system or recharge apparatus in general.

At 500 the controller 408 determines the predetermined sequence by averaging the recharge efficiency value, e.g., the measured current, of each of the last ten (10) efficiency values obtained in the test mode. Thus, for instance, if the transmit coil 306(1) has an average measured current value over the previous ten sessions of eighty (80) milliamps, the transmit coil 306(2) has an average measured current value of one hundred ten (110) milliamps, the transmit coil 306(3) has an average measured current value of one hundred (100) milliamps, the transmit coil 306(4) has an average measured current value of ninety (90) milliamps, and the transmit coil 306(5) has an average measured current value of one hundred twenty (120) milliamps, the predetermined order may be the transmit coils 306(5), 306(2), 306(3), 306(4), 306(1).

At 502, the controller 408 selects a highest-ordered one of the transmit coils 306 that has not yet been tested. In the above example, on the first round of the test mode, the transmit coil 306 selected would be the transmit coil 306(5). In the second round, if the second round is needed, the transmit coil 306(2) would be selected, and so forth through the predetermined sequence until, as detailed below, one of the transmit coils 306 is selected to do the recharge session or all of the transmit coils 306 are tested.

At 504, the test mode may proceed by relatively briefly energizing the selected transmit coil 306, e.g., the transmit coil 306(5) in the first round of the test mode, to obtain an efficiency value for the energized transmit coil 306. Thus, in the above example, the controller 408 causes the power source 402 to energize the transmit coil 306(5) for approximately one (1) second.

At 506, the current through the selected transmit coil 306 is measured by the energy efficiency detection circuit 404 as the energy efficiency value.

At 508, the controller 408 receives the energy efficiency value (e.g., the current as detected) from the energy efficiency detection circuit 404 and stores that value in the electronic data storage 406.

At 510, the controller 408 compares the energy efficiency value against a threshold condition. In an example, if the energy efficiency value meets the threshold condition, e.g., meets or exceeds a required value, the controller 408 identities the transmit coil 306 that was tested as the selected transmit coil 306 and proceeds to 514. Thus, in an example, if the transmit coil 306(5) has an energy efficiency value of one hundred ten (110) milliamps and the threshold condition is to meet or exceed one hundred (100) milliamps, then the threshold condition is met and the controller 408 identifies the transmit coil 306(5) as the selected transmit coil 306.

At 512, if all of the transmit coils 306 have been tested the controller 408 selects the one of the transmit coils 306 that has the highest efficiency value in the instant test mode as the selected transmit coil 306 and proceeds to 514. If not all of the transmit coils 306 have been tested the controller 408 returns to 502 and selects the next transmit coil 306 in the predetermined sequence; thus, in the above example, if the transmit coil 306(5) was just tested, the transmit coil 306(2) may be tested next. Thus, in an illustrative example, if none of the transmit coils 306 meet the threshold condition of one hundred (100) milliamps but the transmit coil 306(3) has the highest measured current of ninety-five (95) milliamps, then the controller identifies the transmit coil 306(3) as the selected transmit coil.

At 514, the controller 408 proceeds to the recharge mode and causes the power source 402 to energize the selected transmit coil 306 and conduct an energy transfer session, e.g., a recharge session, with the receive coil 208 until the energy transfer session is terminated according to conditions described herein and/or are known in the art.

While the flowchart of FIG. 5 describes particular steps, it is to be recognized and understood that periodic variations on the steps may be implemented as needed. Thus, in an example, if may be desirable to ensure that at least two transmit coils 306 are tested in any given test mode. Thus, 510 may be modified to require at least two tests and select the transmit coil 306 corresponding to the highest energy efficiency value among the transmit coils 306 tested provided at least one of those transmit coils meets the threshold condition. Moreover, it may be desirable to ensure that all of the transmit coils 306 are tested over time in order to provide current data for determining the predetermined sequence. Thus, in an example, if a transmit coil 306 has not been tested over, e.g., a preceding eight (8) test modes then the predetermined sequence may include such a transmit coil 306 first in the predetermined sequence or may include as a requirement at 510 to test that transmit coil at 510, among any of a variety of mechanisms for ensuring that all transmit coils 306 are periodically tested.

Further implementations of the system 400 may allow for the transmission or otherwise inclusion of information from the wearable article to the system 400 to further facilitate the determination of the predetermined sequence at 500. The information may concern physical properties of the wearable article, such as a size of the wearable article. The information may be previously stored in the electronic data storage 406 or may be transmitted at the start of a recharge session from the wearable article to the system 400 via the wireless connection between one of the transmit coils 306 and the receive coil 208. Alternatively, during the test or recharge mode the information about the wearable article may be transmitted and stored in the electronic data storage 406 for use in future recharge sessions.

Transmission of the information may be conducted by the wearable article modulating the load on the receive coil 208 to adjust the current through the receive coil 208 and, by extension, the current induced in the energized transmit coil 306. Thus, in an example, a current meter of the energy efficiency detection circuit 404 may detect changes in current which may be interpretable by the controller 408 as data providing the information. Examples in which additional or alternative wireless links, e.g., according to conventional WiFi or Bluetooth wireless modalities, may allow for the direct transmittal of the information rather than or in addition to the wireless link between the coils 208, 306.

FIGS. 6A-6D are images of the system 400 where the wearable articles are articles of footwear 600 incorporating the motorized lacing system 100, in example embodiments. The recharge apparatus 300 is configured for multiple sizes of the articles of footwear 600 (herein after "shoes", without limitation on the types of articles of footwear that may actually be utilized with respect to the recharge apparatus 300). Thus, the recharge apparatus 300 is configured to seat a pair of shoes 600 with the pair of shoes 600 being of any of a variety of different sizes 600A, 600B without requiring modification to the recharge apparatus 300. Thus, in an example, the pair of shoes 600A may be United States size seven (7) shoes while the pair of shoes 600B may be United States size sixteen (16) shoes, with both pairs of shoes 600A, 600B able to utilize the recharge apparatus 300 without modification to the recharge apparatus 300, albeit in various examples not simultaneously.

Figure 6A:
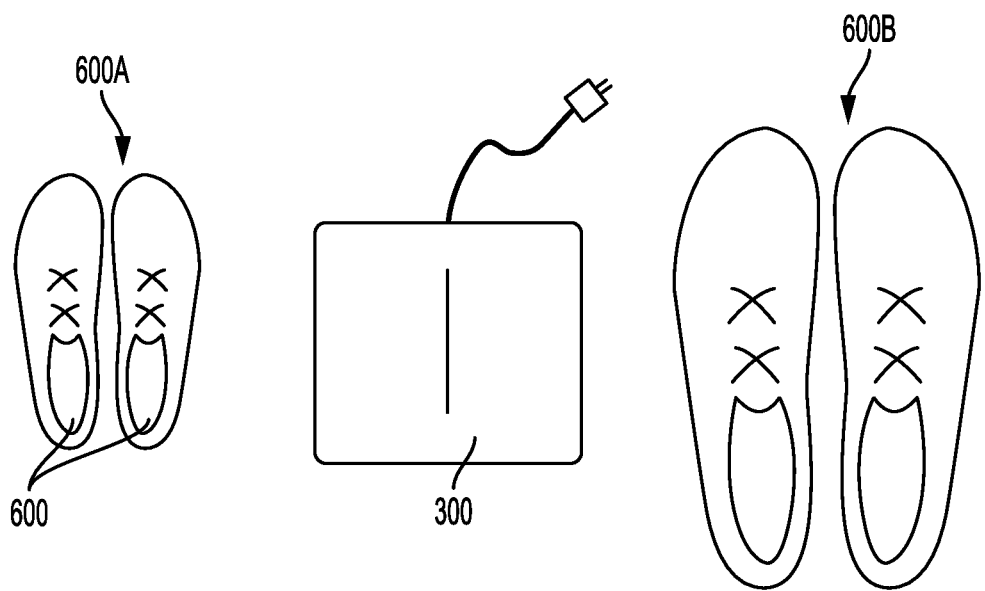
FIGS. 6A-6D are images of a system where the wearable articles are articles of footwear incorporating the motorized lacing system, in example embodiments.

FIG. 6A illustrates the pair of shoes 600A, 600B in relation to the recharge apparatus 300 and the disparity in size of the pairs of shoes 600A, 600B that may still be recharged by the system 400.

Figure 6B:
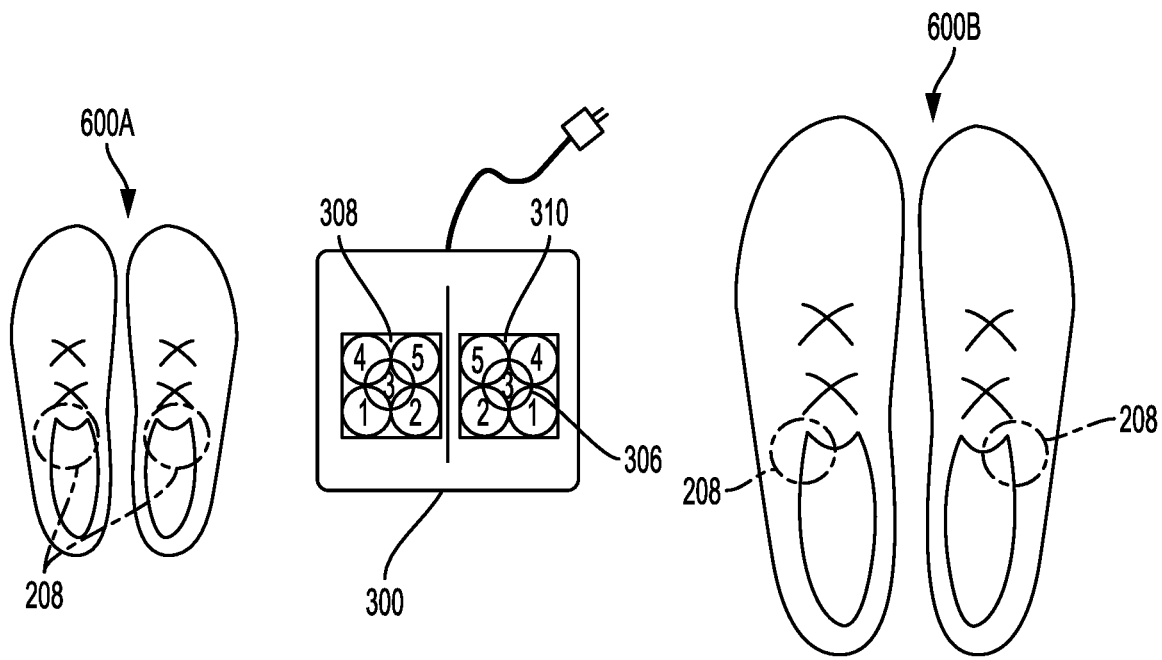

FIG. 6B illustrates example positioning of the receive coils 208 between the different pairs of shoes 600A, 600B and the positioning of the transmit coils 306 within the recharge sections 308, 310. It is noted and emphasized that, owing to the difference in size between the pairs of shoes 600A, 600B, the receive coils 208 in the illustrated example have different relative positioning within the pairs of shoes 600A, 600B. Thus, the receive coil 208 is more centrally located in the pair of shoes 600A than in the pair of shoes 600B, in which the receive coil 208 is relatively more offset.

Figure 6C:
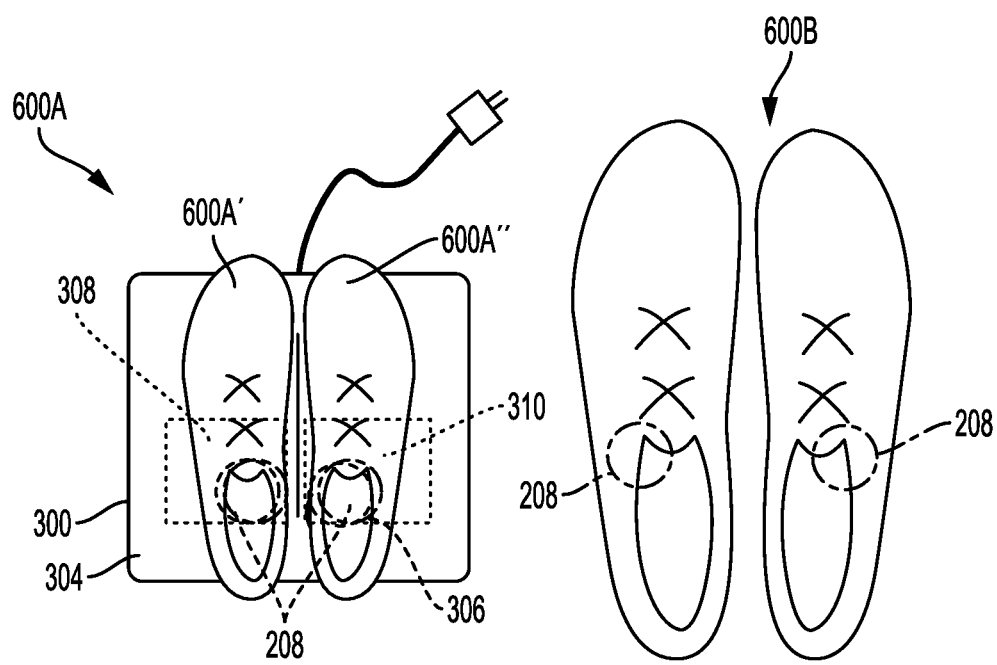

FIG. 6C illustrates the positioning of the pair of shoes 600A on the recharge apparatus 300 and the positioning of the receive coil 208 in relation to the transmit coils 306. In particular, the pair of shoes 600A is depicted as being in a likely, ordinary position on the recharge apparatus, with the left shoe 600A' positioned on the recharge section 308 and the right shoe 600A" on the recharge section 310. It is noted that, because the recharge apparatus 300 in the illustrated example is flat and does not fixedly secure the shoes 600A in any particular orientation on the recharge surface 304, individual shoes 600A', 600A" may end up in any of a variety of orientations on the recharge surface 304.

In general, it may be likely that a user who recharges the shoes 600A will tend to place the shoes 600A in a similar orientation when placing the shoes 600A on the recharge surface 304. The illustrated orientation shows the shoes 600A generally parallel and centered in the respective recharge sections 308, 310. However, various users may consistently place the shoes 600A at angles with respect to one another and the recharge apparatus 300, off-centered, and so forth, but may tend to be consistent with the angle and offset. Thus, while in the generally parallel and centered orientation illustrated the receive coil 208 may be expected to align with the transmit coil 306(2), angled and/or offset orientations may tend to result in any of a variety of the other transmit coils 306, e.g., transmit coil 306(3), providing the best efficiency. Because the operations of the controller illustrated in FIG. 5, however, if the user is consistent in how the user places the shoes 600A on the recharge surface 304, the controller may note that, in the first example, the transmit coil 306(2) consistently provides the best efficiency, the transmit coil 306(2) may consistently be selected as the first transmit coil of the predetermined sequence. Similarly, in the second example, the transmit coil 306(3) may consistently be selected as the first transmit coil 306 of the predetermined sequence.

It is noted that if the user is even relatively slightly consistent with how the shoes 600A are positioned on the recharge surface the controller 408 will tend to note the increased frequency with which a given recharge coil 306 tends to provide the most efficient connection. Thus, even if one recharge coil 306 provides the most efficient connection twenty-five (25) percent of the time, if no other recharge coil 306 provides the most efficient connection more often than that then the one recharge coil 306 may still be placed first in the predetermined sequence.

It is further noted and emphasized that the two recharge sections 308, 310 may be treated separately. As illustrated, the same numbered transmit coil 306, i.e., transmit coil 306(2), is in the most efficient alignment with the receive coils 208, that is not necessarily the case. Thus, if the user consistently places the shoe 600A' such that the receive coil 208 is in alignment with the transmit coil 306(1) of the recharge section 308 but the shoe 600A" such that the receive coil 208 is in alignment with the transmit coil 306(2), the controller 408 may set the transmit coil 306(1) as the first transmit coil 306 in the predetermined sequence for the recharge section 308 but the transmit coil 306(2) as the first transmit coil 306 in the predetermined sequence for the recharge section 310.

Figure 6D:
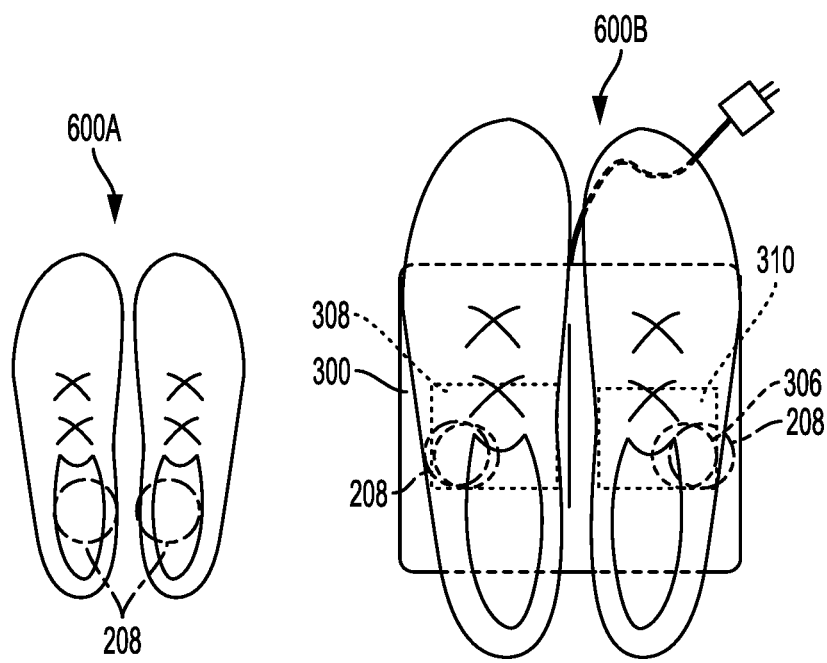

FIG. 6D is an illustration of the shoes 600B in a similar orientation to that of the shoes 600A in FIG. 6C. However, because of the difference in size between the shoes 600A and 600B, the related receive coils 208 tend to align with different transmit coils 306 between the shoes 600A and 600B. Thus, in contrast to the shoes 600A, the predetermined sequence for a user having shoes 600B who consistently places the shoes 600B in the illustrated orientation may tend to start with the transmit coil 306(1).

It is noted and emphasized that if the user is not consistent with how the shoes 600 are placed on the recharge surface 304, or if the user places shoes 600 of different size on the recharge surface 304 from session to session, the predetermined sequence will be less likely to start with the transmit coil 306 that is in actual alignment with the receive coil 208. However, the operations of the flowchart of FIG. 5 may still tend to result the commencement of a recharge session earlier than a recharge apparatus 300 that does not dynamically select the most efficient transmit coil 306 because the flowchart of FIG. 5 still provides for ceasing the test mode upon identifying one of the transmit coils 306 that meets the threshold condition. Thus, the system 400 may still be expected, on average, to commence the recharge mode before a recharge system that does not operate according to the flowchart of FIG. 5 and the principles disclosed herein.

As disclosed herein, the motorized lacing system 100 generally may transmit information to the recharge system 400 related to the shoes 600. In an example, the motorized lacing system 100 may transmit a shoe size to the recharge system 400. The controller 408 may incorporate such information, e.g., as illustrated herein, in determining the predetermined sequence. Thus, if the shoe size is seven (7) the controller 408 may give a bonus value, e.g., increase the historical efficiency value by twenty (20) percent, to the transmit coil 306(2) or may set the transmit coil 306(2) to be first in the predetermined sequence, while if the shoe size is sixteen (16) the controller 408 may provide a bonus value or may set the transmit coil 306(1) to be the first in the predetermined sequence. It is noted that, where information is transmitted via a link between the receive coil 208 and a receive coil 306 as disclosed herein, the information transfer may occur during a recharge session after the predetermined sequence has been set. In such an example, the information may be saved in the electronic data storage 406 and utilized in the next recharge session to set the predetermined sequence, as disclosed herein.

Figure 7:
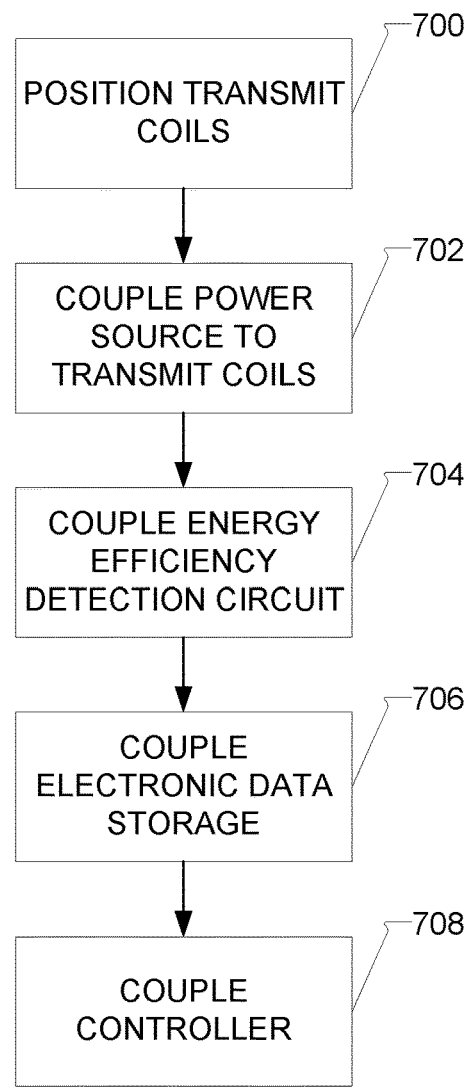
FIG. 7 is a flowchart for making a recharge apparatus, in an example embodiment.

FIG. 7 is a flowchart for making a recharge apparatus, in an example embodiment. The recharge apparatus may the recharge apparatus 300 or any other suitable recharge apparatus. Additionally or alternatively, the flowchart may be utilized to make the system 400 or any other suitable system.

At 700, a plurality of transmit coils are positioned in a pattern within a housing of a recharge apparatus to allow at least one of the plurality of transmit coils to establish a wireless link with a receive coil positioned in proximity of the recharge apparatus. In an example, the housing of the recharge apparatus has a recharge surface on which a wearable article including the receive coil is configured to be placed to place the receive coil in proximity of at least one of the plurality of transmit coils.

At 702, a power source is coupled to the plurality of transmit coils, the power source configured to selectively energize ones of the plurality of transmit coils to transfer power to the receive coil.

At 704, an energy efficiency detection circuit is coupled to the plurality of transmit coils, the energy efficiency detection circuit configured to detect an electrical response of each one of the plurality of transmit coils when energized by the power source, the electrical response indicative of an energy efficiency between the one of the plurality of transmit coils and the receive coil. In an example, the energy efficiency detection circuit comprises a current meter and wherein the electrical response is a current induced through the individual ones of the plurality of transmit coils.

At 706, an electronic data storage configured to store data indicative of the energy efficiency to generate a historical record of energizing the plurality of transmit coils is coupled to the energy detection circuit.

At 708, a controller is coupled to the electronic data storage and the power source, the controller configured to cause the power source to selectively energize ones of the plurality of transmit coils, wherein the at least one transmit coil is selected according to a statistical analysis of the historical record and the electrical response indicative of the energy efficiency meeting a minimum efficiency criterion for energy transfer to the receive coil, wherein if the selected at least one coil fails to satisfy the measured electrical response a next transmit coil of the plurality of transmit coils is selected. In an example, the controller is further configured to determine a predetermined sequence of the plurality of transmit coils based on the statistical analysis of the historical record, and wherein the controller is configured to select the next transmit coil of the plurality of transmit coils by selecting an immediately subsequent one of the plurality of transmit coils from the predetermined sequence. In an example, the predetermined sequence is further based, at least in part, on an amount of time since individual ones of the plurality of transmit coils were selected. In an example, the amount of time is based, at least in part, on a number of times the controller has selectively energized at least one of the plurality of transmit coils without energizing an individual one of the plurality of transmit coils. In an example, the plurality of transmit coils is a first plurality of transmit coils and further comprising positioning, in the housing, a second plurality of transmit coils coupled to the power source and the energy efficiency detection circuit, wherein the recharge surface includes a first recharge section corresponding to the first plurality of recharge coils and a second recharge section corresponding to the second plurality of recharge coils, wherein the controller is configured to cause the power source to concurrently selectively energize individual ones of the first plurality of transmit coils and individual ones of the second plurality of transmit coils based on receive coils being placed in proximity of the first and second recharge sections, respectively.

EXAMPLES

In Example 1, a system includes a recharge apparatus, comprising a plurality of transmit coils positioned in a pattern to allow at least one of the plurality of transmit coils to establish a wireless link with a receive coil positioned in proximity of the recharge apparatus, a power source coupled to the plurality of transmit coils and configured to selectively energize ones of the plurality of transmit coils to transfer power to the receive coil, an energy efficiency detection circuit coupled to the plurality of transmit coils and configured to detect an electrical response of each one of the plurality of transmit coils when energized by the power source, the electrical response indicative of an energy efficiency between the one of the plurality of transmit coils and the receive coil, an electronic data storage, coupled to the energy detection circuit, configured to store data indicative of the energy efficiency to generate a historical record of energizing the plurality of transmit coils, and a controller, coupled to the electronic data storage and the power source, configured to cause the power source to selectively energize ones of the plurality of transmit coils, wherein the at least one transmit coil is selected according to a statistical analysis of the historical record and the electrical response indicative of the energy efficiency meeting a minimum efficiency criterion for energy transfer to the receive coil, wherein if the selected at least one coil fails to satisfy the measured electrical response a next transmit coil of the plurality of transmit coils is selected.

In Example 2, the system of Example 1 optionally further includes that the controller is further configured to determine a predetermined sequence of the plurality of transmit coils based on the statistical analysis of the historical record, and wherein the controller selects the next transmit coil of the plurality of transmit coils by selecting an immediately subsequent one of the plurality of transmit coils from the predetermined sequence.

In Example 3, the system of any one or more of Examples 1 and 2 optionally further includes that the predetermined sequence is further based, at least in part, on an amount of time since individual ones of the plurality of transmit coils were selected.

In Example 4, the system of any one or more of Examples 1-3 optionally further includes that the amount of time is based, at least in part, on a number of times the controller has selectively energized at least one of the plurality of transmit coils without energizing an individual one of the plurality of transmit coils.

In Example 5, the system of any one or more of Examples 1-4 optionally further includes that the recharge apparatus has a recharge surface on which a wearable article including the receive coil is configured to be placed to place the receive coil in proximity of at least one of the plurality of transmit coils.

In Example 6, the system of any one or more of Examples 1-5 optionally further includes that the plurality of transmit coils is a first plurality of transmit coils and further comprising a second plurality of transmit coils coupled to the power source and the energy efficiency detection circuit, wherein the recharge surface includes a first recharge section corresponding to the first plurality of recharge coils and a second recharge section corresponding to the second plurality of recharge coils, wherein the controller is configured to cause the power source to concurrently selectively energize individual ones of the first plurality of transmit coils and individual ones of the second plurality of transmit coils based on receive coils being placed in proximity of the first and second recharge sections, respectively.

In Example 7, the system of any one or more of Examples 1-6 optionally further includes that the energy efficiency detection circuit comprises a current meter and wherein the electrical response is a current induced through the individual ones of the plurality of transmit coils.

In Example 8, a recharge apparatus includes a plurality of transmit coils positioned in a pattern to allow at least one of the plurality of transmit coils to establish a wireless link with a receive coil positioned in proximity of the recharge apparatus, a power source coupled to the plurality of transmit coils and configured to selectively energize ones of the plurality of transmit coils to transfer power to the receive coil, an energy efficiency detection circuit coupled to the plurality of transmit coils and configured to detect an electrical response of each one of the plurality of transmit coils when energized by the power source, the electrical response indicative of an energy efficiency between the one of the plurality of transmit coils and the receive coil, an electronic data storage, coupled to the energy detection circuit, configured to store data indicative of the energy efficiency to generate a historical record of energizing the plurality of transmit coils, and a controller, coupled to the electronic data storage and the power source, configured to cause the power source to selectively energize ones of the plurality of transmit coils, wherein the at least one transmit coil is selected according to a statistical analysis of the historical record and the electrical response indicative of the energy efficiency meeting a minimum efficiency criterion for energy transfer to the receive coil, wherein if the selected at least one coil fails to satisfy the measured electrical response a next transmit coil of the plurality of transmit coils is selected.

In Example 9, the recharge apparatus of Example 8 optionally further includes that the controller is further configured to determine a predetermined sequence of the plurality of transmit coils based on the statistical analysis of the historical record, and wherein the controller selects the next transmit coil of the plurality of transmit coils by selecting an immediately subsequent one of the plurality of transmit coils from the predetermined sequence.

In Example 10, the recharge apparatus of any one or more of Examples 8 and 9 optionally further includes that the predetermined sequence is further based, at least in part, on an amount of time since individual ones of the plurality of transmit coils were selected.

In Example 11, the recharge apparatus of any one or more of Examples 8-10 optionally further includes that the amount of time is based, at least in part, on a number of times the controller has selectively energized at least one of the plurality of transmit coils without energizing an individual one of the plurality of transmit coils.

In Example 12, the recharge apparatus of any one or more of Examples 8-11 optionally further includes that the recharge apparatus has a recharge surface on which a wearable article including the receive coil is configured to be placed to place the receive coil in proximity of at least one of the plurality of transmit coils.

In Example 13, the recharge apparatus of any one or more of Examples 8-12 optionally further includes that the plurality of transmit coils is a first plurality of transmit coils and further comprising a second plurality of transmit coils coupled to the power source and the energy efficiency detection circuit, wherein the recharge surface includes a first recharge section corresponding to the first plurality of recharge coils and a second recharge section corresponding to the second plurality of recharge coils, wherein the controller is configured to cause the power source to concurrently selectively energize individual ones of the first plurality of transmit coils and individual ones of the second plurality of transmit coils based on receive coils being placed in proximity of the first and second recharge sections, respectively.

In Example 14, the recharge apparatus of any one or more of Examples 8-13 optionally further includes that the energy efficiency detection circuit comprises a current meter and wherein the electrical response is a current induced through the individual ones of the plurality of transmit coils.

In Example 15, a method includes positioning a plurality of transmit coils in a pattern within a housing of a recharge apparatus to allow at least one of the plurality of transmit coils to establish a wireless link with a receive coil positioned in proximity of the recharge apparatus, coupling a power source to the plurality of transmit coils, the power source configured to selectively energize ones of the plurality of transmit coils to transfer power to the receive coil, coupling an energy efficiency detection circuit to the plurality of transmit coils, the energy efficiency detection circuit configured to detect an electrical response of each one of the plurality of transmit coils when energized by the power source, the electrical response indicative of an energy efficiency between the one of the plurality of transmit coils and the receive coil, coupling, to the energy detection circuit, an electronic data storage configured to store data indicative of the energy efficiency to generate a historical record of energizing the plurality of transmit coils, and coupling, to the electronic data storage and the power source, a controller configured to cause the power source to selectively energize ones of the plurality of transmit coils, wherein the at least one transmit coil is selected according to a statistical analysis of the historical record and the electrical response indicative of the energy efficiency meeting a minimum efficiency criterion for energy transfer to the receive coil, wherein if the selected at least one coil fails to satisfy the measured electrical response a next transmit coil of the plurality of transmit coils is selected.

In Example 16 the method of Example 17 optionally further includes that the controller is further configured to determine a predetermined sequence of the plurality of transmit coils based on the statistical analysis of the historical record, and wherein the controller is configured to select the next transmit coil of the plurality of transmit coils by selecting an immediately subsequent one of the plurality of transmit coils from the predetermined sequence.

In Example 17, the method of any one or more of Examples 15 and 16 optionally further includes that the predetermined sequence is further based, at least in part, on an amount of time since individual ones of the plurality of transmit coils were selected.

In Example 18, the method of any one or more of Examples 15-17 optionally further includes that the amount of time is based, at least in part, on a number of times the controller has selectively energized at least one of the plurality of transmit coils without energizing an individual one of the plurality of transmit coils.

In Example 19, the method of any one or more of Examples 15-18 optionally further includes that the housing of the recharge apparatus has a recharge surface on which a wearable article including the receive coil is configured to be placed to place the receive coil in proximity of at least one of the plurality of transmit coils.

In Example 20, the method of any one or more of Examples 15-19 optionally further includes that the plurality of transmit coils is a first plurality of transmit coils and further comprising positioning, in the housing, a second plurality of transmit coils coupled to the power source and the energy efficiency detection circuit, wherein the recharge surface includes a first recharge section corresponding to the first plurality of recharge coils and a second recharge section corresponding to the second plurality of recharge coils, wherein the controller is configured to cause the power source to concurrently selectively energize individual ones of the first plurality of transmit coils and individual ones of the second plurality of transmit coils based on receive coils being placed in proximity of the first and second recharge sections, respectively.

In Example 21, the method of any one or more of Examples 15-20 optionally further includes that the energy efficiency detection circuit comprises a current meter and wherein the electrical response is a current induced through the individual ones of the plurality of transmit coils.

As used herein, the term "memory" refers to a machine-readable medium able to store data temporarily or permanently and may be taken to include, but not be limited to, random-access memory (RAM), read-only memory (ROM), buffer memory, flash memory, ferroelectric RAM (FRAM), and cache memory. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system, comprising:
    a recharge apparatus, comprising a plurality of transmit coils positioned in a pattern to allow at least one of the plurality of transmit coils to establish a wireless link with a receive coil positioned in proximity of the recharge apparatus;
    a power source coupled to the plurality of transmit coils and configured to selectively energize ones of the plurality of transmit coils to transfer power to the receive coil;
    an energy efficiency detection circuit coupled to the plurality of transmit coils and configured to detect an electrical response of each one of the plurality of transmit coils when energized by the power source, the electrical response indicative of an energy efficiency between the one of the plurality of transmit coils and the receive coil;
    an electronic data storage, coupled to the energy detection circuit, configured to store data indicative of the energy efficiency to generate a historical record of energizing the plurality of transmit coils; and
    a controller, coupled to the electronic data storage and the power source, configured to cause the power source to selectively energize ones of the plurality of transmit coils, wherein the at least one transmit coil is selected according to:
    a statistical analysis of the historical record; and
    the electrical response indicative of the energy efficiency meeting a minimum efficiency criterion for energy transfer to the receive coil, wherein if the selected at least one coil fails to satisfy the measured electrical response a next transmit coil of the plurality of transmit coils is selected;
    wherein the controller is further configured to determine a predetermined sequence of the plurality of transmit coils based on the statistical analysis of the historical record, and wherein the controller selects the next transmit coil of the plurality of transmit coils by selecting an immediately subsequent one of the plurality of transmit coils from the predetermined sequence.

2. The system of claim 1, wherein the predetermined sequence is further based, at least in part, on an amount of time since individual ones of the plurality of transmit coils were selected.

3. The system of claim 2, wherein the amount of time is based, at least in part, on a number of times the controller has selectively energized at least one of the plurality of transmit coils without energizing an individual one of the plurality of transmit coils.

4. The system of claim 1, wherein the recharge apparatus has a recharge surface on which a wearable article including the receive coil is configured to be placed to place the receive coil in proximity of at least one of the plurality of transmit coils.

5. The system of claim 4, wherein the plurality of transmit coils is a first plurality of transmit coils and further comprising a second plurality of transmit coils coupled to the power source and the energy efficiency detection circuit, wherein the recharge surface includes a first recharge section corresponding to the first plurality of recharge coils and a second recharge section corresponding to the second plurality of recharge coils, wherein the controller is configured to cause the power source to concurrently selectively energize individual ones of the first plurality of transmit coils and individual ones of the second plurality of transmit coils based on receive coils being placed in proximity of the first and second recharge sections, respectively.

6. The system of claim 1, wherein the energy efficiency detection circuit comprises a current meter and wherein the electrical response is a current induced through the individual ones of the plurality of transmit coils.

7. A recharge apparatus, comprising:
    a plurality of transmit coils positioned in a pattern to allow at least one of the plurality of transmit coils to establish a wireless link with a receive coil positioned in proximity of the recharge apparatus;
    a power source coupled to the plurality of transmit coils and configured to selectively energize ones of the plurality of transmit coils to transfer power to the receive coil;
    an energy efficiency detection circuit coupled to the plurality of transmit coils and configured to detect an electrical response of each one of the plurality of transmit coils when energized by the power source, the electrical response indicative of an energy efficiency between the one of the plurality of transmit coils and the receive coil;
    an electronic data storage, coupled to the energy detection circuit, configured to store data indicative of the energy efficiency to generate a historical record of energizing the plurality of transmit coils; and
    a controller, coupled to the electronic data storage and the power source, configured to cause the power source to selectively energize ones of the plurality of transmit coils, wherein the at least one transmit coil is selected according to:
    a statistical analysis of the historical record; and
    the electrical response indicative of the energy efficiency meeting a minimum efficiency criterion for energy transfer to the receive coil, wherein if the selected at least one coil fails to satisfy the measured electrical response a next transmit coil of the plurality of transmit coils is selected;
    wherein the controller is further configured to determine a predetermined sequence of the plurality of transmit coils based on the statistical analysis of the historical record, and wherein the controller selects the next transmit coil of the plurality of transmit coils by selecting an immediately subsequent one of the plurality of transmit coils from the predetermined sequence.

8. The recharge apparatus of claim 7, wherein the predetermined sequence is further based, at least in part, on an amount of time since individual ones of the plurality of transmit coils were selected.

9. The recharge apparatus of claim 8, wherein the amount of time is based, at least in part, on a number of times the controller has selectively energized at least one of the plurality of transmit coils without energizing an individual one of the plurality of transmit coils.

10. The recharge apparatus of claim 7, wherein the recharge apparatus has a recharge surface on which a wearable article including the receive coil is configured to be placed to place the receive coil in proximity of at least one of the plurality of transmit coils.

11. The recharge apparatus of claim 10, wherein the plurality of transmit coils is a first plurality of transmit coils and further comprising a second plurality of transmit coils coupled to the power source and the energy efficiency detection circuit, wherein the recharge surface includes a first recharge section corresponding to the first plurality of recharge coils and a second recharge section corresponding to the second plurality of recharge coils, wherein the controller is configured to cause the power source to concurrently selectively energize individual ones of the first plurality of transmit coils and individual ones of the second plurality of transmit coils based on receive coils being placed in proximity of the first and second recharge sections, respectively.

12. The recharge apparatus of claim 7, wherein the energy efficiency detection circuit comprises a current meter and wherein the electrical response is a current induced through the individual ones of the plurality of transmit coils.

13. A method, comprising:
positioning a plurality of transmit coils in a pattern within a housing of a recharge apparatus to allow at least one of the plurality of transmit coils to establish a wireless link with a receive coil positioned in proximity of the recharge apparatus;
coupling a power source to the plurality of transmit coils, the power source configured to selectively energize ones of the plurality of transmit coils to transfer power to the receive coil;
coupling an energy efficiency detection circuit to the plurality of transmit coils, the energy efficiency detection circuit configured to detect an electrical response of each one of the plurality of transmit coils when energized by the power source, the electrical response indicative of an energy efficiency between the one of the plurality of transmit coils and the receive coil;
coupling, to the energy detection circuit, an electronic data storage configured to store data indicative of the energy efficiency to generate a historical record of energizing the plurality of transmit coils; and
coupling, to the electronic data storage and the power source, a controller configured to cause the power source to selectively energize ones of the plurality of transmit coils, wherein the at least one transmit coil is selected according to:
a statistical analysis of the historical record;
the electrical response indicative of the energy efficiency meeting a minimum efficiency criterion for energy transfer to the receive coil, wherein if the selected at least one coil fails to satisfy the measured electrical response a next transmit coil of the plurality of transmit coils is selected;
determining, with the controller, a predetermined sequence of the plurality of transmit coils based on the statistical analysis of the historical record, and wherein the controller is configured to select the next transmit coil of the plurality of transmit coils by selecting an immediately subsequent one of the plurality of transmit coils from the predetermined sequence.

14. The method of claim 13, wherein the predetermined sequence is further based, at least in part, on an amount of time since individual ones of the plurality of transmit coils were selected.

15. The method of claim 14, wherein the amount of time is based, at least in part, on a number of times the controller has selectively energized at least one of the plurality of transmit coils without energizing an individual one of the plurality of transmit coils.

16. The method of claim 13, wherein the housing of the recharge apparatus has a recharge surface on which a wearable article including the receive coil is configured to be placed to place the receive coil in proximity of at least one of the plurality of transmit coils.

17. The method of claim 16, wherein the plurality of transmit coils is a first plurality of transmit coils and further comprising positioning, in the housing, a second plurality of transmit coils coupled to the power source and the energy efficiency detection circuit, wherein the recharge surface includes a first recharge section corresponding to the first plurality of recharge coils and a second recharge section corresponding to the second plurality of recharge coils, wherein the controller is configured to cause the power source to concurrently selectively energize individual ones of the first plurality of transmit coils and individual ones of the second plurality of transmit coils based on receive coils being placed in proximity of the first and second recharge sections, respectively.

18. The method of claim 13, wherein the energy efficiency detection circuit comprises a current meter and wherein the electrical response is a current induced through the individual ones of the plurality of transmit coils.

* * * * *